Sept. 29, 1925.

F. L. MAIN

VEHICLE WHEEL

Filed Jan. 29, 1925

1,555,786

WITNESS
J. H. Perrault

INVENTOR
Frank L. Main
BY
Edward N. Pagelsen
ATTORNEY

Patented Sept. 29, 1925.

1,555,786

UNITED STATES PATENT OFFICE.

FRANK L. MAIN, OF BIRMINGHAM, MICHIGAN, ASSIGNOR TO HAYES WHEEL COMPANY, OF JACKSON, MICHIGAN, A CORPORATION OF MICHIGAN.

VEHICLE WHEEL.

Application filed January 29, 1925. Serial No. 5,441.

*To all whom it may concern:*

Be it known that I, FRANK L. MAIN, a citizen of the United States, and residing at Birmingham, in the county of Oakland and State of Michigan, have invented a new and Improved Vehicle Wheel, of which the following is a specification.

This invention relates to the construction of vehicle wheels embodying sheet metal discs connecting the rims and tires, and its object is to provide a wheel of this character which can be constructed at low cost, which shall have maximum carrying capacity for its weight, and which can be assembled correctly by unskilled labor.

This invention consists of a hub and a rim and a disc between them, the hub having a conical flange and the disc having a central portion drawn out to form a conical portion adapted to fit the flange on the hub.

It further consists in an annular reinforcing member of sheet metal fitting between the flange on the hub and the conical portion of the disc to reinforce the latter.

It also consists in a hub cap forming the central portion of the disc and fitting on the outer end of the hub.

Figure 2:
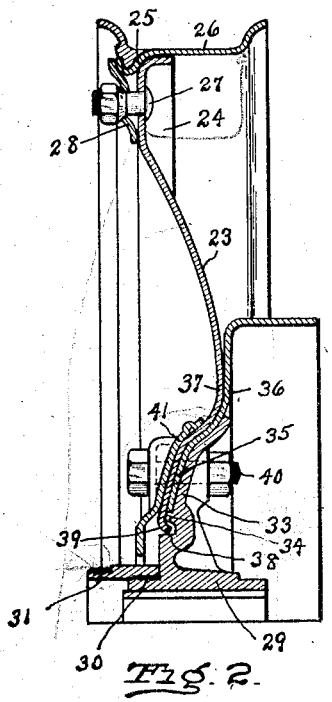
Figure 1:
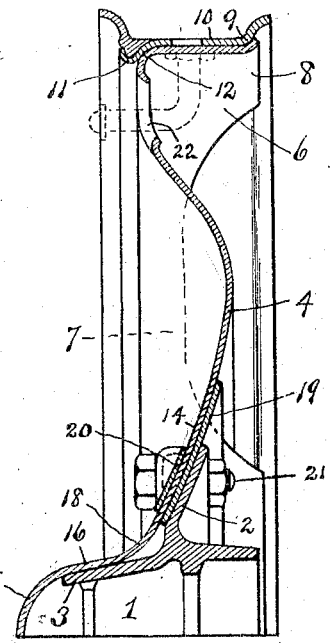
Figure 3:
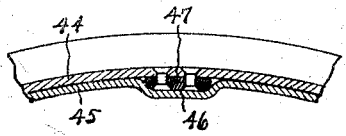
Figure 4:
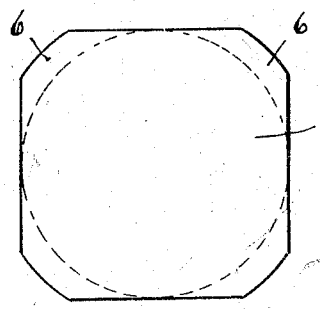

In the accompanying drawing, Fig. 1 is a radial section of a wheel embodying the present invention. Fig. 2 is a similar section of a modified form of wheel. Fig. 3 is a section of the rim on a plane transverse to the axis of the hub. Fig. 4 is a plan of a blank for a wheel disc.

Similar reference characters refer to like parts throughout the several views.

The hub 1 is formed with a conical flange 2 and with a slightly conical outer end 3. A disc 4 may be formed from an approximately square sheet 5 of metal, preferably steel, the segments 6 being left on the usual circular disc to constitute intermittent extensions of the felly 7 of the disc, (Fig. 1). The edges 8 of these extensions are curved outwardly so as to contact with the curved portion 9 of the rim 10 but these extensions will yield to permit the rib 11 on this rim to have a line contact with the curved portion 12 of the disc.

The disc is concave outwardly, the curvature merging into the conical portion 14 which is parallel to the conical face of the flange 2 on the hub. The central portion of the sheet 5 is drawn to form the substantially hemispherical hub cap 15 which terminates in a conical portion 16 that fits a conical portion 3 of the hub. The two conical portions 14 and 16 are connected by the curved portion 18.

Discs of this character often break just outside of the supporting flange 2. In order to reinforce the disc the substantially conical annulus 19 is provided which may be attached to the disc or be free therefrom. A clamping ring 20 and bolts 21 secure the disc in position. I have shown the disc provided with an aperture 22 through which the valve stem of the tire may extend to the outer side of the disc.

The result of this peculiar curvature of the disc and its two lines of support spaced apart as shown in Fig. 1 is a wheel of great stiffness and load capacity, while at the same time possessing considerable resilience. As the two conical surfaces of both the hub and the disc can be accurately machined, improper assembly is substantially impossible.

The disc 23 shown in Fig. 2 is formed from the usual circular disc having its center cut out and its periphery bent laterally to form a felly 24 with which the rib 25 on the rim 26 makes line contact. Bolts 27 and rim clamps 28 serve to secure the rim to the felly.

The hub 29 is shown threaded at 30 to receive a sleeve 31 onto the outer end of which the usual hub-cap may be screwed. The flange 33 on the hub has a conical face and a circular shoulder 34 to position the conical inner portion 35 of the inner end portion 36 of the brake drum. This end 36 is concave outwardly and the portion 37 of the disc 23 fits both the concave and the conical portions of the end 36 of the brake drum. The inner edge 39 of the disc 23 is bent to fit on the cylindrical shoulder 38 of the hub. A clamping ring 41 engages both the concave and conical portions of the disc 23 and the bolts 40 secure these parts together.

Fig. 3 is a section of a rim 44 and supporting felly 45, the plane of the section being at right angles to the axis of the wheel. The felly is formed with a pocket 46 while a small block 47 is secured to the rim and prevents rotary movement between the felly and rim. This block may be termed a driving member.

The details of construction and the proportions of the parts of this wheel may be changed by those skilled in the art without departing from the spirit of my invention as set forth in the following claims.

I claim:—

1. In a wheel, the combination with a hub having a conical flange thereon, a dished disc having a conical portion supported by the flange on the hub, an auxiliary annular member between the flange on the hub and the conical part of the disc and extending outward from the flange of the hub in contact with the disc to reinforce the same along the line of greatest stress, and a clamping ring and clamping bolts to secure the disc and reinforcing annulus to the hub, the central part of the disc being approximately hemispherical to constitute a hub cap.

2. In a wheel, the combination with a hub having a conical flange thereon, a dished disc having a conical portion supported by the flange on the hub, an auxiliary annular member between the flange on the hub and the conical part of the disc and extending outward from the flange of the hub in contact with the disc to reinforce the same along the line of greatest stress, and a clamping ring and clamping bolts to secure the disc and reinforcing annulus to the hub, the central part of the disc being approximately hemispherical to constitute a hub cap, the outer end of the hub being conical and fitting within a conical bearing surface of the cap-portion of the disc.

FRANK L. MAIN.